Feb. 6, 1951 C. W. HANSELL 2,540,876

PULSE COMMUNICATION SYSTEM

Original Filed Sept. 16, 1943 4 Sheets-Sheet 1

INVENTOR
CLARENCE W. HANSELL.
BY Harry Tunick
ATTORNEY

PULSE COMMUNICATION SYSTEM

Original Filed Sept. 16, 1943 4 Sheets-Sheet 2

INVENTOR
CLARENCE W. HANSELL.
BY Harry Tunick
ATTORNEY

Feb. 6, 1951 C. W. HANSELL 2,540,876

PULSE COMMUNICATION SYSTEM

Original Filed Sept. 16, 1943 4 Sheets-Sheet 3

INVENTOR
CLARENCE W. HANSELL.
BY Harry Tunick
ATTORNEY

INVENTOR
CLARENCE W HANSELL.
BY Barry Tunick
ATTORNEY

Patented Feb. 6, 1951

2,540,876

UNITED STATES PATENT OFFICE 2,540,876

PULSE COMMUNICATION SYSTEM

Clarence W. Hansell, Rocky Point, N. Y., assignor to Radio Corporation of America, a corporation of Delaware Original application September 16, 1943, Serial No. 502,585. Divided and this application June 10, 1947, Serial No. 753,782

17 Claims. (Cl. 332—14)

The present invention is a division of my copending application, Serial No. 502,585 filed September 16, 1943, now U. S. Patent 2,425,314, granted August 12, 1947 and relates to a communication system in which means is provided to limit and select the range of distances over which communication is carried out and to exclude undesired communications or interference from stations at other distances.

More specifically, the invention provides a distance selective pulse communication system in which the range of distances within which communication is possible is controllable, so that any pair of stations at a particular distance from one another may be used for communication in a manner which excludes interference from stations at other distances. By means of this distance selective feature, which may be used, if desired, in combination with great angular selectivity due to antenna directivity patterns, as well as a certain amount of frequency selectivity, and thresholding and limiting in the receiver, there is provided a degree of freedom from interference and jamming which would be difficult if not impossible to obtain by other systems.

In the practice of the invention, communication is carried on by means of pulses of energy whose length in time is very short compared with the time interval between pulses, and which pulses are repeated at a pulse rate or frequency which is higher than the highest modulation frequencies of the signals to be transmitted. Because of the fact that transmission or reception utilizes only a small percentage of the total time, I am able, among other things, to accomplish two-way or duplex transmission and reception between a pair of stations without interference from the transmitter into the receiver at the same station. This is done by arranging the transmission and reception time periods at any one station so that they are different and do not coincide in time. Thus, during periods of pulse transmission from a station, reception at the same transmitting station is suppressed and output from the receiver at this same station is unaffected by its own transmitter. The waves of each transmitting station are received at the other station on a receiver which is made responsive substantially only to pulses being received at a particular controllable pulse rate. Also, the receiver at each station is controlled to make it responsive only to received signal pulses distinct from its own transmitted pulses. It is desirable in the practice of the invention that transmission and reception be carried out on the same or nearly the same radio carrier frequencies.

In the system of the present invention, it is intended that when the transmitter at, say, station 1, transmits a pulse, this pulse is received at station 2, utilized for reproducing modulations, and also utilized for controlling the timing of pulses transmitted from station 2. Pulses received from station 2 at station 1, in turn are utilized to control the timing of pulses from station 1. Thus, a sort of closed pulsing circuit or round robin situation is set up in which the time rate of pulses at both stations is locked together so that the transmitters of the two stations transmit or fire pulses alternately and at equal pulsing rates. In the receiver of each station, there are provided adjustable time delay regeneration, or receiver sensitivity keying or modulation circuits responsive to received pulses which cut off the receivers during time periods when pulses are not due to be received from the corresponding stations but which cause the receiver to be in a condition to respond to desired pulses from the corresponding station. By this means, any one transmitting and receiving station can be made responsive only to other station at a particular distance or narrow range of distances according to the adjustment of the keying circuit time delay in each receiver and the more or less fixed pulse time delay present in the circuits between receiver input and transmitter output. With the system of the invention, any other pulsing transmitter at some other distance would automatically require a different pulsing rate than that for which the receiver of a particular station is adjusted and consequently no response to transmitters at undesired distances would be obtained. Therefore, the operator at any one station may, at will, adjust his equipment to be responsive only to another station at a desired distance. In addition, by means of sharp directivity, the operator at any one station may limit operation to another station in only one narrow range of directions. It is therefore possible, according to the invention, for any one station to limit operations to a particular small area at a selected distance and direction, so that jamming from other similar types of pulsing communication equipment can be greatly reduced, or virtually eliminated.

In order to achieve a selected narrow range of distances within a larger range of selectable distances over which communication may be carried on, in accordance with the present invention, it is important that the pulse periods be very short with relatively long time periods between pulses. I prefer to employ short pulses of the order of one microsecond and less. The distance selectivity obtainable by the invention is inversely proportional to the pulse time period. The minimum distance for which the system may be adjusted is also inversely proportional to the pulse time period. The shorter the pulse, the smaller the range of distances within a larger selectable range to which the system may be adjusted to be selective. Thus, the system of the invention may be selectable, or adjustable, for use over a range of distances between approximately one-quarter of a mile and several miles extending up to fifty miles, for example. By adjusting the length of the pulse, it is possible to select for communication an extremely small range of distances within this larger range, in order to eliminate interference from stations outside this small selected range. If, for example, the time interval of the pulse is one microsecond, then it is possible to differentiate between stations over a wide range of distances which differ in distance with respect to some other station by as little as 300 meters. In practice, considering the present state of development, it is possible to produce pulses as short as one-tenth of a microsecond.

The pulse repetition rate or frequency must be higher than the highest modulation frequency required in any particular system of communication to which the invention is to be applied. For example, in a single channel voice communication system requiring modulation frequencies up to 3000 cycles per second, it is desirable to use a pulse repetition rate of not less than 9000 cycles per second, although pulse rates as low as 5000 cycles per second will give intelligible communication.

In some cases the modulation may require the pulse repetition rate to be so high that there is insufficient time between pulses to accommodate travel of the waves out to a distant station and back. In such cases it is still possible to operate by letting two or more pulses exist in the space circuit simultaneously although, of course, in this instance there will be more than one distance at which communication is possible. In fact, theoretically, there are always a series of discrete distances at which one set of adjustments will provide communication, though, in practice, this will not be very troublesome.

Although the invention is hereafter described with particular reference to a system employing radio communication at ultra high frequencies, it should be understood that the principles are also applicable to wire line communication, submarine signalling or to any other kind of communication by means of traveling waves.

A more detailed description of the invention follows in conjunction with a drawing, wherein:

Fig. 1 diagrammatically illustrates, in box form, a pair of radio stations equipped in accordance with the present invention for duplex communication by means of very short pulses of extremely high frequency energy;

Figure 1:
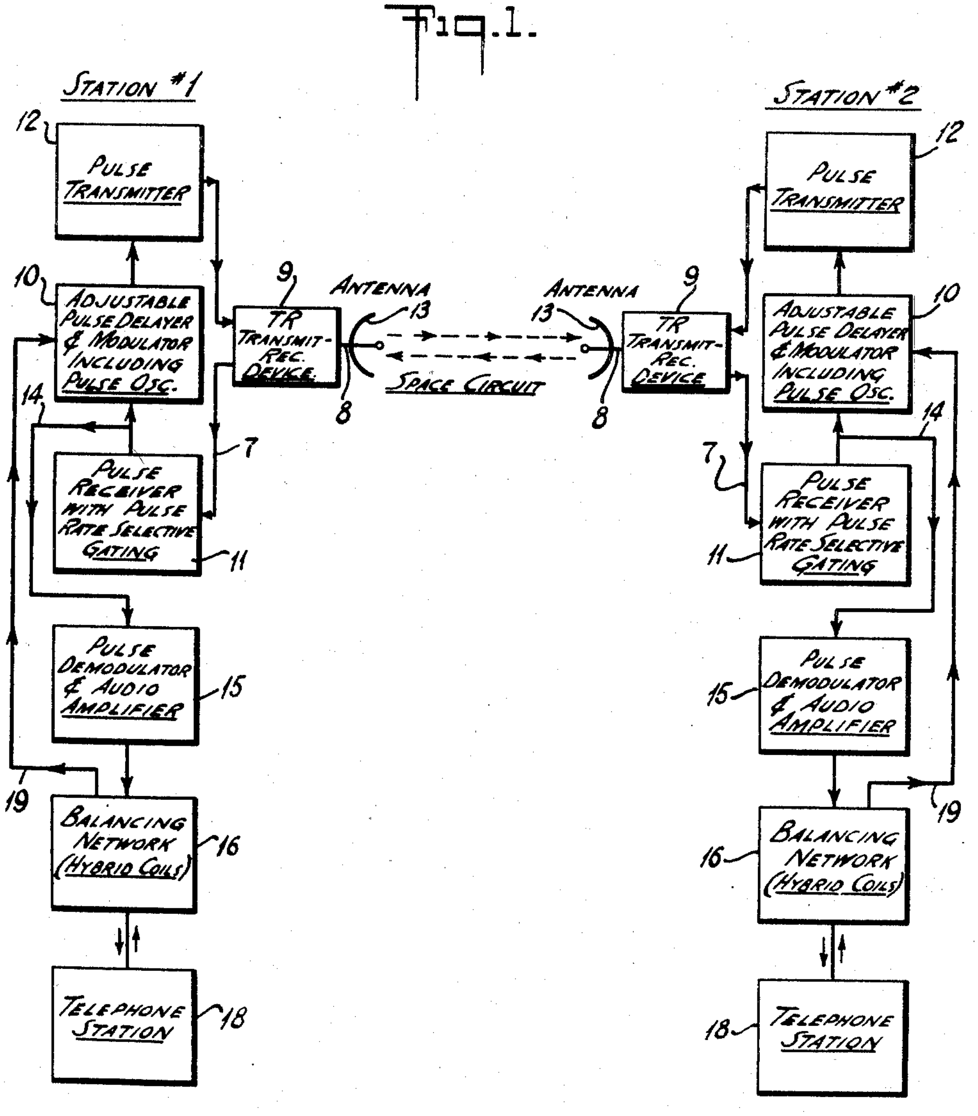

Referring to Fig. 1, there is shown a distance selective radio communication system comprising a pair of radio stations 1 and 2 for effecting two-way communication with each other. In view of the fact that both stations are similarly equipped and the apparatus identically labeled in the drawing, only one of these stations will be described. Both stations are pulse repeater stations for repeating short pulses of extremely high frequency energy back and forth between them. Pulses of high frequency energy leaving station 1 travel to station 2 from which they are repeated back to station 1, then again repeated to station 2, etc. As a result, each station transmits a succession of pulses repeated at a frequency determined by the time required for waves to pass over the space circuit plus time delays in the equipment. Thus, by providing at both repeater stations means for modulating the time delay of pulses passing through the equipment, there is caused to occur at both repeater stations a corresponding response in pulse rate or frequency. The variations in pulse rate or frequency at the station receiving the modulated pulses are demodulated, as a result of which it is possible to carry on communication in either direction.

Each of the stations 1 and 2 of Fig. 1 includes a pulse transmitter 12 feeding a transmit-receive device 9 to be described in more detail hereafter, the latter in turn being associated with a suitable directive antenna 13, here shown by way of example only as a parabolic reflector having a radiator at its focus. The transmit-receive device 9 is also coupled to apparatus 11 comprising a pulse receiver with a pulse rate selective "gating" circuit. A portion of the output of apparatus 11 is fed into an adjustable pulse delayer and modulator circuit 10, which includes a pulse oscillator, the circuit 10 in turn being coupled to the pulse transmitter 12 for controlling the same. Another portion of the output from apparatus 11 is fed via lead 14 to a pulse demodulator and audio amplifier circuit 15 from which the demodulated energy is fed to a balancing network 16. Associated with the network 16 is a telephone station 18, including the usual transmitting and receiving equipment. The telephone station 18 at each repeater station includes an earphone and a microphone, like any well known telephone station. A connection also extends from the unit 16 via lead 19 to the adjustable pulse delayer and modulator circuit 10.

The antenna 13 is employed both to radiate the high frequency pulses and to receive pulses from the remote station. The radiator at the focus of the parabolic reflector is coupled over a transmission line 8 to the transmit-receive device 9, the purpose of which is to uncouple the receiver from the transmission line system 8 while the transmitter is operating and to uncouple the transmitter from the transmission line system 8 when it is not operating, so that between transmitted pulses maximum received power from the antenna may be delivered to the receiver. The transmit-receive device 9 may be any suitable circuit employed for this purpose, several of which have been developed for use with military radio locating pulsing systems. One suitable transmit-receive device which may be employed is described in copending application Serial No. 477,435, filed February 27, 1943, by N. E. Lindenblad. Another suitable transmit-receive device is described in copending application Serial No. 466,274, filed November 20, 1942, by E. I. Anderson. However, because of its superior performance, I prefer to use a type of transmit-receive device invented by N. E. Lindenblad which is described in copending application Serial No. 504,373 filed September 30, 1943, now Patent No. 2,416,105.

The pulses received by the transmit-receive device 9 are passed on to the pulse receiving unit 11 via lead 7 and a portion of the output from unit 11 is passed on to the adjustable pulse delayer and modulator unit 10, in order to control the exact timing of the pulsing of transmitter 12. As mentioned before, a portion of the pulse output of the receiver 11 is also passed by way of lead 14 to the pulse demodulator and audio amplifier unit 15, the output of which in turn is fed to the balancing network 16. Network 16 comprises suitable hybrid coils of the type well known in the telephone art, for preventing interference between transmitting and receiving energy. By means of the use of balancing network 16, demodulated energy from unit 15 can only go to the earphone or utilization circuit of telephone station 18 and cannot reach lead 19 or be carried to unit 10. Likewise, by virtue of the network 16, energy from the microphone of telephone station 18 can only go to unit 10 over lead 19, and cannot go to unit 15. It will thus be seen that the primary function of the network 16 is to prevent energy from unit 15 from reaching unit 10 over lead 19 in sufficient volume to cause "singing," a condition sometimes found in telephone practice.

The circuit apparatus of units 11 and 15 are shown in detail in Fig. 2, to be described later. Alternative forms of apparatus for unit 15 are shown in detail in Figs. 3 and 4, also to be described later.

The circuit apparatus for units 10 and 12 are shown in detail in Figs. 6 and 7, to be described later.

A general description of the operation of the system of Fig. 1 will now be given. Each transmitter 12 at the two stations sends out pulses which are initiated by a pulse oscillator associated with and contained within the adjustable pulse delayer and modulator 10. By arranging the directive antennas 13, 13 at both stations so that they are pointed toward each other, each station will receive the pulses from the other station. At each station, the receiver unit 11 is of a type which provides synchronous "gating" to receive pulses when the pulse repetition rate is correct. The term "gating" is here employed to mean controlling the receiving apparatus so as to render the receiver responsive at such times when pulses are due to arrive. If, for example, each transmitter sends out 20,000 pulses per second, then the receivers are adjusted to synchronize and "gate" themselves to admit only one chain of pulses repeated at a rate of 20,000 pulses per second, plus or minus the amount of pulse frequency change which may be required by signal modulations. The required range of pulse rate or frequency is obtained by making the receiver responsive periods somewhat longer than the length of the transmitted pulses. In order to make the system distance selective, pulses from the output of the receiver apparatus 11 at each station are given an adjustable time delay in unit 10 and then utilized to control the time of pulsing of the transmitter 12. This may be done by using the received pulse to synchronize the operation of the pulse oscillator in unit 10 which controls the pulsing of the transmitter 12. Once this synchronism has been accomplished at both stations, by suitable adjustment of the time delays, then we have a distance selective communication system.

It is preferred, in operating the system of Fig. 1, that the pulsing oscillator in unit 10 at each station be turned "off" during idle periods, thereby stopping transmission, but that the receivers be maintained operative, except for the self-synchronizing feature, during these idle periods. Then, when one station is to be used to call the other station, its time delay in unit 10 is set for minimum, corresponding to the maximum range of distance, its receiver gating synchronizing circuits are made operative, and its pulsing oscillator in unit 10 turned "on" and the other station called by voice, tone signal or any other calling modulation. The attendant at the second station having heard the call, which happens when his gated receiver drifts through synchronism with the distant calling station, then switches in his locking circuits for holding his receiver gating in synchronism continuously to the particular calling station. He then starts his transmitter pulsing oscillator in his unit 10 and adjusts the time delay of his system until he can hear his own speech coming back from the calling station, as the receiver of the calling station locks in to the transmitter of the called station. Both stations are then in condition for two-way communication, and the attendant at the called station knows from the adjustment of his time delay circuit what the exact distance is to the calling station.

An alternative method of operation which can be used, particularly when there are a plurality of stations greater than two, similarly equipped in accordance with the invention, is for the operator of each of a number of unused stations to set his time delay circuit to a minimum corresponding to a maximum range of distance. Then, when any one station is to be used to call any other station, the operator at the calling station merely adjusts his time delay circuit to correspond with the distance to the station to be called. This adjustment should automatically lock the two stations together, so that the two-way communication can be carried on between them. This communication is protected from interference by the distance selectivity feature.

It should be understood that the pulse rates at the stations in communication with each other are always the same at any one time, although these pulse rates can be varied from time to time as agreed upon in advance. By modulating the time delay at any one station, the system is so arranged that automatically the frequency of the pulses at any two stations in communication with each other is modulated. It will thus be evident that the system of Fig. 1 is particularly useful in cases where it is desired to modulate the pulse rate or pulse frequency for effecting two-way communication between a pair of similarly equipped stations on extremely short pulses of ultra high frequency energy.

Figure 2:
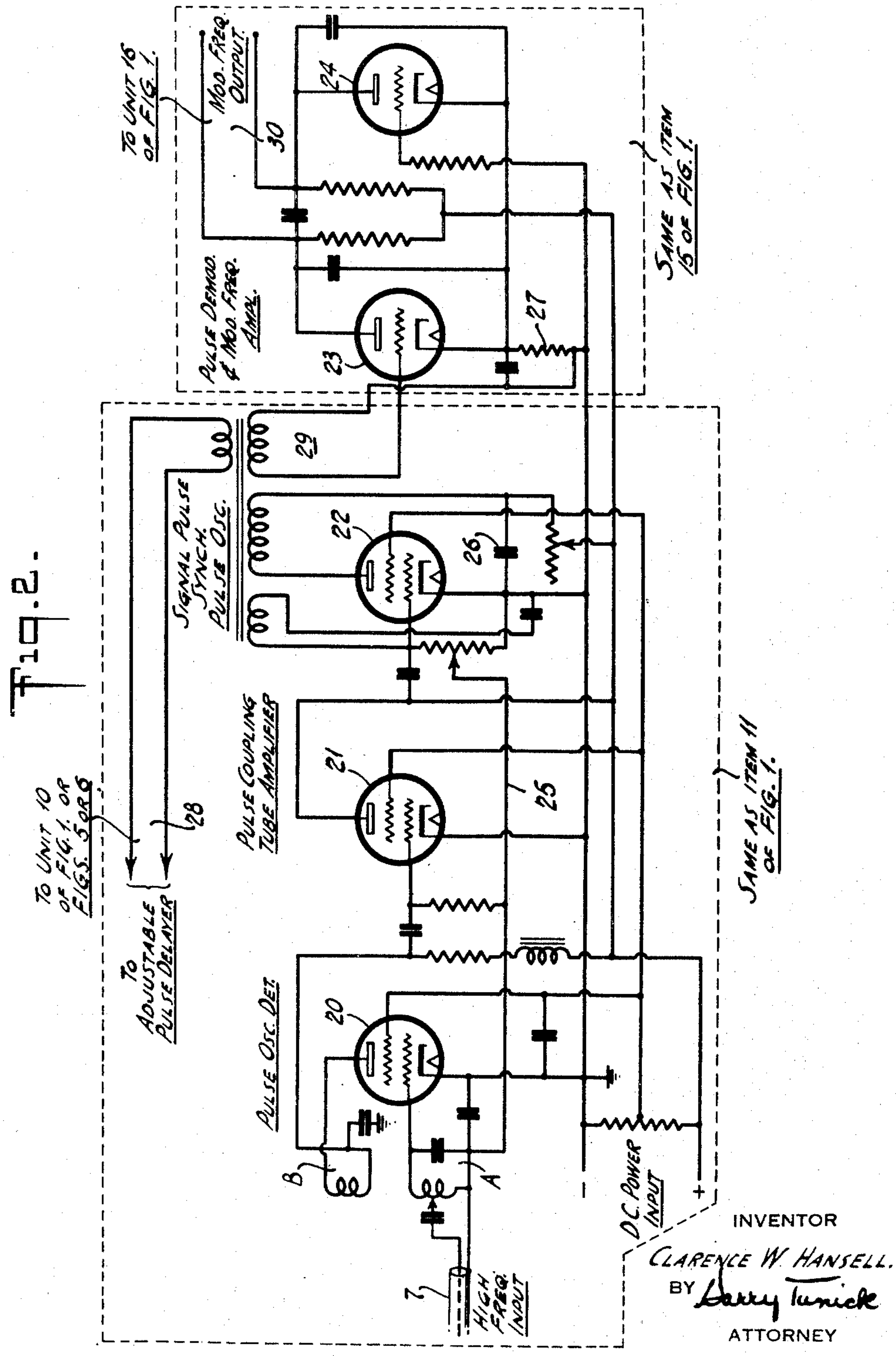
Fig. 2 is a schematic circuit diagram showing in detail the pulse receiver and pulse demodulator circuits which can be used in the stations of Fig. 1.

Fig. 2 shows in detail circuit arrangements for the apparatus of units 11 and 15 of Fig. 1. The circuits of units 11 and 15 in Fig. 2 are separately enclosed by dotted lines, and separately labeled.

Referring to Fig. 2 in more detail, the unit 11 comprising the pulse receiver with pulse rates selective "gating" circuit comprises a high frequency pulse oscillator-detector 20 constituted by a pair of frequency selective circuits A and B tuned to the frequency of the carrier wave, a pulse coupling tube amplifier 21 whose input is coupled to the output of the oscillator-detector 20, and a signal pulse synchronized pulse oscillator 22, whose input is coupled to the output of the amplifier 21. Output from the synchronized pulse oscillator 22 is taken by leads 28, which extends to the apparatus of unit 10 of Fig. 1 or to the apparatus of unit 40 of Fig. 6, to be later described. A portion of the output of the pulse oscillator 22 is also passed on by way of leads 29 to unit 15, which is shown in Fig. 2 as comprising a pair of vacuum tubes 23 and 24 constituting the pulse demodulator and modulation frequency amplifier. The tuned circuit A of the high frequency pulse oscillator-detector 20 is coupled by way of a transmission line 7 to the transmit-receive device 9 of Fig. 1. The vacuum tube circuit 20 is normally in a non-conductive or current cut-off condition, by virtue of relatively large negative bias potential placed on the control grid of tube 20 over lead 25, due to grid rectification occurring in the synchronized signal pulse oscillator 22. Thus, the pulse oscillator-detector 20 is normally in a non-oscillating condition. Synchronized pulse oscillator 22, however, is a blocking oscillator type and oscillates continuously at a frequency slightly lower than the incoming signal pulse rate. At regular intervals, when oscillator 22 passes anode current (which occurs when condenser 26 discharges), the grid of tube 22 is made momentarily positive and simultaneously drives positive the grid of oscillator-detector tube 20 and pulse coupling tube amplifier 21. This positive pulsing of the tube 20 causes oscillations to start in the tube circuit 20. This is because the tube 20 passes through a condition of zero high frequency resistance at the moment of transition from the oscillating to the non-oscillating condition, when its control electrode is pulsed positively, at which time it will begin oscillating and be extremely sensitive and responsive to the incoming pulses of radio frequency energy from line 7. Although the tube circuit 20 is extremely sensitive to received signal power, at or near this period of zero resistance, the oscillator-detector 20 is very insensitive and affected relatively little by received power before and after this period of zero resistance. The exact timing of oscillations of tube circuit 20 is controlled by the incoming energy over line 7. Oscillator-detector tube 20 will oscillate until quenched by the negative bias from the pulse oscillator 22 which occurs immediately after condenser 26 discharges. After the discharge of condenser 26, the tube 20 is cut-off, leaving its grid highly negative. Thus, it can be said that the oscillator-detector tube circuit 20 is like a super-regenerative detector which is sensitive to received signal energy only during the time period when it is passing through the condition of nearly zero alternating current resistance. As for the blocking oscillator 22, this can take either the form shown in my United States Patent No. 1,898,181, granted February 21, 1933, or the form shown in Tolson et al. U. S. Patent No. 2,101,520, granted December 7, 1937. In my patent supra, the controlling time constant circuit of the oscillator is in the anode circuit, while in the Tolson et al. patent the controlling time constant circuit is in the grid circuit.

As soon as the oscillator-detector tube 20 begins oscillation under control of the incoming signal, it passes increasing anode current which causes a negative direct current pulse of potential to be delivered to the control grid of coupling tube amplifier 21, this last tube in turn amplifying and reversing the polarity of the impressed pulse to thereby deliver a positive pulse to the control grid of oscillator 22, thus exerting an effect on the timing of the pulses of the oscillator tube circuit 22. In effect, therefore, the oscillator tube circuit 22 opens the "gate" or controls the periods of responsiveness of tube 20 in order to allow signal pulses to go through the receiver unit to thereby synchronize the oscillator 22. Pulse oscillator 22 has a natural pulse repetition rate of its own, which is approximately the same as the repetition rate of the input pulses and is therefore readily synchronized by the input pulses. The input pulses cause a small time delay in the cutting off of tube 22, which delay varies, as necessary to maintain synchronism. It will thus be evident that any small lack of synchronism of the oscillator 22 compared with the incoming pulse rate is automatically corrected by the received signal pulses. The entire system, once adjusted so that it is held in synchronism by received pulses, follows modulation of the frequency of the received pulses.

The output of constant amplitude pulses from the signal pulse synchronized pulse oscillator 22 of receiving unit 11 is impressed by way of leads 29 upon detector unit 15 which is the pulse demodulator and modulation frequency amplifier. Frequency modulations of the pulse rate are demodulated in detector unit 15. This unit 15 is shown as consisting of a pair of vacuum tubes 23 and 24 having a common cathode resistance 27. The two tubes 23 and 24 are so arranged that for an average pulse rate applied to leads 29, both tubes 23 and 24 will carry equal currents. A variation of the pulse rate, however, impressed upon these tubes will cause a differential variation in the two tube currents which shows up as a push-pull variation of potential and current in output leads 30. The greater the current flow in common cathode resistor 27 due to an increased number of pulses applied to the grid of tube 23, over and above the average pulse rate, the more negative will be the bias on the grid of tube 24, as a result of which there will be less current in the output of tube 24. If fewer pulses are applied to tube 23 than the average pulse rate, the current conditions of both tubes 23 and 24 will be reversed from that just described.

Interference from undesired stations is discriminated against; first, because of the directivity of the antennas of the stations in communication with each other; secondly, by virtue of the frequency selectivity of the radio frequency circuits including the effective selectivity of the circuits A and B of the pulse oscillator-detector 20 as it passes through zero high frequency resistance, and thirdly, by the pulse rate selectivity of the pulse oscillator 22. Once synchronism has been established to a particular train of received pulses, then timing selectivity will automatically be utilized because the pulses received between periods of nearly zero resistance in the pulse oscillator-detector circuit 20 have substantially no effect upon the receiver of Fig. 2.

Figure 3:
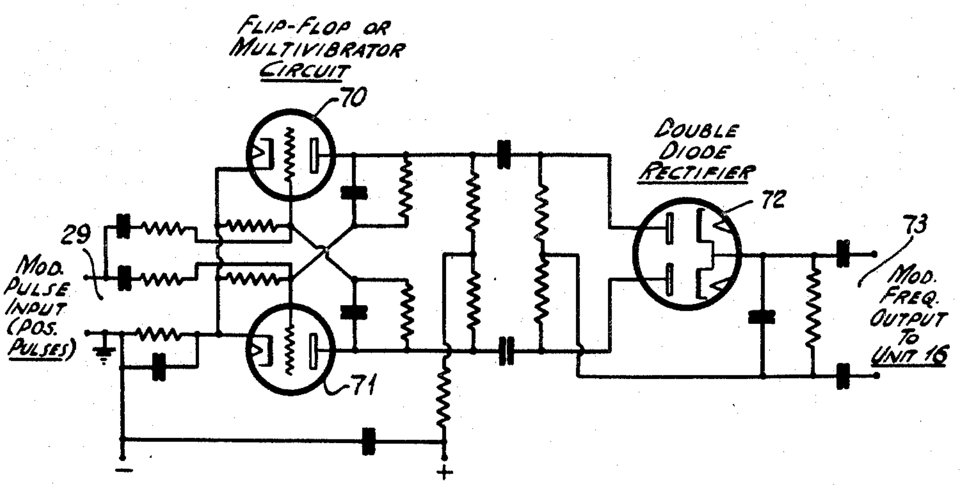
Figs. 3 and 4 illustrate alternative forms of pulse demodulator and audio amplifier circuits which can be used in the stations of Fig. 1.
Figure 4:
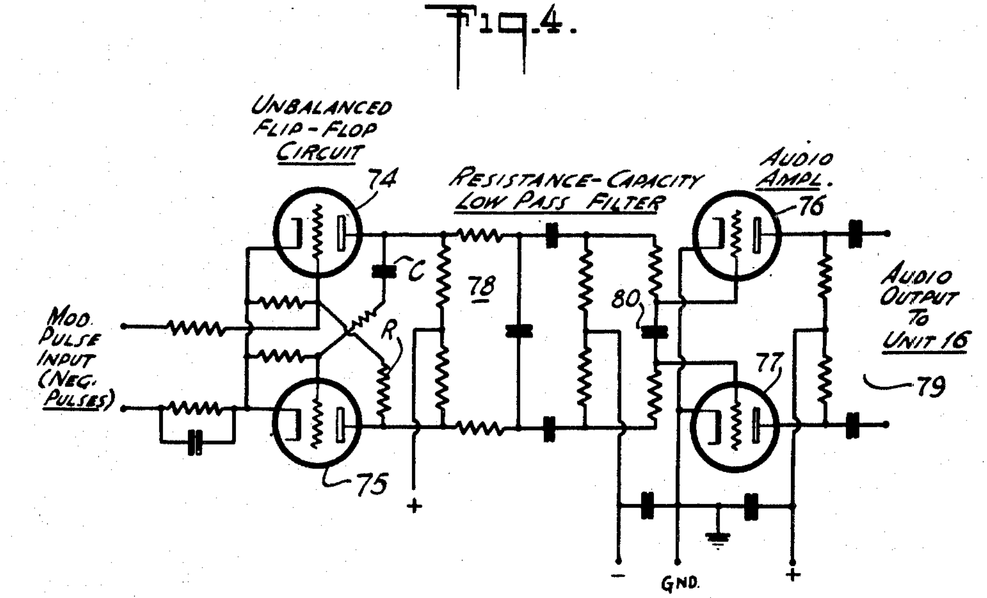

Figs. 3 and 4 show alternative forms of pulse demodulators which can be used for unit 15 and can take the place of the apparatus of unit 15 of Fig. 2.

The circuit of Fig. 3 comprises the combination of a multi-vibrator or flip-flop circuit having vacuum tubes 70 and 71 and a double diode rectifier 72. The multi-vibrator circuit 70, 71 is known in the art as the Eccles-Jordan type, and has two conditions of stability corresponding to one tube or the other passing anode to cathode current at any one time. The application of positive pulses to the grids of the tubes 70, 71 over leads 29 above a certain potential causes the multi-vibrator circuit to pass suddenly from one stable condition to the other, in which case the current passing conditions of the two tubes will be reversed. The rectifier 72, which is connected to the anodes of the tubes 70 and 71 of the multi-vibrator, passes current each time the vibrator flips or changes its condition of stability. Thus, the average current passed by the rectifier is proportional to the number of flips or changes of stability of the vibrator; or, putting it in other words, to the number of incoming positive pulses applied to the vibrator, but this average current passed by the rectifier 72 is independent of the amplitude of these pulses over a range. Thus, the rectifier current available in output circuit 73 is proportional to the pulse frequency but nearly independent of the pulse amplitude. If the input pulses are frequency modulated, then the average current through the double diode rectifier 72 will be substantially proportional to the frequency or rate but substantially independent of the amplitude of the input pulses so long as the amplitude is above a threshold value. The arrangement of Fig. 3 thus acts as a thresholder, limiter and demodulator of frequency modulated pulses. Inputs which are too weak will not change the stability condition of the multi-vibrator, while inputs greater than that needed to change the stability of the multi-vibrator have no increased effect over and above an input sufficient to change the condition of equilibrium of the multi-vibrator.

Fig. 4 is another form of thresholder, limiter and pulse demodulator for unit 15. The system of Fig. 4 includes an unbalanced flip-flop or multi-vibrator circuit sometimes called a trigger circuit having tubes 74 and 75 in combination with an audio amplifier consisting of tubes 76 and 77. The unbalanced multi-vibrator circuit 74, 75 has one degree of electrical stability, and has a stable state and an active state. After input pulses throw the multi-vibrator circuit to the active state or condition, the circuit automatically restores itself or throws itself back to the stable state after an interval of time about equal to half the time interval between pulses, when the pulses have an average repetition rate. It should be noted that the anode of tube 74 is connected to the grid of tube 75 through condenser C, while the anode of tube 75 is connected to the grid of tube 74 through resistor R, thus providing different types of feed-back between the two tubes. The time for the circuit to throw its balance back is constant but the time between pulses is varied by the modulation. It will thus be seen that the percentage time occupied by the unbalanced flip-flop or multi-vibrator circuit in the stable state position or the other varies with the pulse rate, and this percentage unbalance one way or the other provides a push-pull modulation frequency output which passes through the resistance-capacity low pass filter 78 and is utilized by the audio amplifier 76, 77. Audio amplifier tubes 76, 77 are both arranged to pass current at all times. In the system of Fig. 4, if the rate or frequency of the control pulses is modulated, the percentage time spent by the flip-flop circuit 74, 75 in one condition or the other will be modulated and this results in a differential variation of the average anode currents of the two tubes 74, 75. This differential variation provides the output potential at the modulation frequency, which is amplified in tubes 76 and 77 to provide a final modulation audio frequency output in leads 79. The condenser 80 across the grids of the audio amplifier is a by-pass condenser which more or less short-circuits energy of the pulse frequency.

Figure 5:
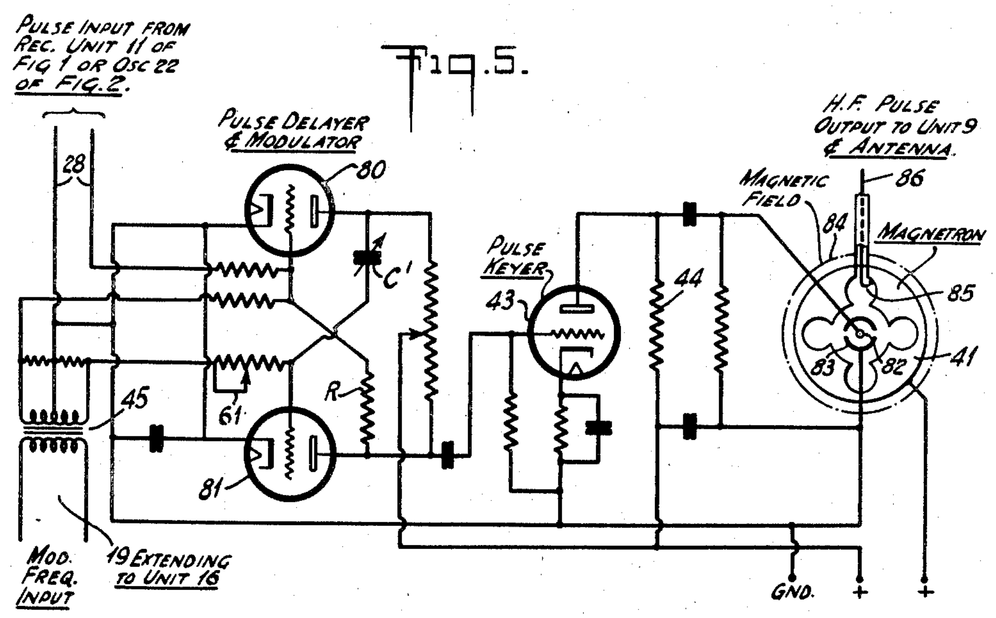
Figs. 5 and 6 illustrate two different forms of adjustable pulse delayer and modulator circuits and pulse transmitters, which can be used in stations of Fig. 1.

Fig. 5 shows in detail the combined units 10 and 12 of Fig. 1. In Fig. 5, the adjustable pulse delayer and modulator comprises a pair of vacuum tubes 80 and 81, arranged in the form of a flip-flop or unbalanced multi-vibrator circuit having one degree of electrical stability, similar to that shown in Fig. 4. This pulse delayer and modulator circuit corresponds to unit 10 of Fig. 1 and receives pulse input from the receiver unit 11 over leads 28. Leads 28 may extend to the signal pulse synchronized pulse oscillator 22 of Fig. 2. Modulation frequency input for the pulse delayer modulator is impressed upon the circuit over leads 19 and transformer 45, the leads 19 extending to the balancing network unit 16 of Fig. 1. It should be noted that the condenser C′ of the pulse oscillator modulator in the feed-back circuit between the anode of tube 80 and the grid of tube 81 is adjustable, and that the resistor 61 in series between the grid of tube 81 and the transformer 45 is also adjustable. In order to get the maximum range of distance, the pulse delayer and modulator circuit of Fig. 5 is set so that the time delay units are arranged for minimum time delay for a particular pulse rate. This is done in Fig. 5 by adjusting the capacity of condenser C′ to a minimum value and adjusting resistor 61 also to a minimum. However, in order to obtain minimum distances, the condenser C′ is adjustated to give maximum capacity, and resistor 61 adjusted to give maximum resistance, thus giving maximum time delay. The pulse transmitter of Fig. 5, corresponding to unit 12 of Fig. 1, comprises a pulse magnetron 41 which is coupled to the pulse delayer and modulator circuit 80, 81 by way of a pulse keyer vacuum tube 43. The pulse keyer 43 is normally biased to be in an anode current cut-off condition, in which state there will be no potential drop across resistor 44. When the pulses over leads 28 flip or throw the circuit balance of the pulse delayer and modulator 80, 81 in one direction from the stable to the active state, the pulse keyer control electrode of tube 43 is pulsed negative with the only result that the already small or zero potential drop across resistance 44 in series with the anode to cathode of the keyer 43 remains zero, or is made momentarily slightly lower. However, when the circuit 80, 81 flops back again (i. e., restores itself), the control electrode of the keyer tube 43 is driven momentarily positive, resulting in a large momentary potential across the resistance 44 in series with the keyer tube. This large momentary potential across the resistance 44 occurs because of the fact that tube 43 passes current momentarily. This momentarily large increase in potential across the resistance 44 appears between the hot and cold cathodes 82 and 83, respectively, of the magnetron oscillator and causes this oscillator to produce a pulse of extremely high frequency oscillations. The magnetron is not claimed herein per se, and is of the controllable type described in my copending application Serial No. 470,768, filed December 31, 1942, now U. S. Patent 2,409,038 granted October 8, 1946. This type of magnetron oscillator includes an anode having an even number of target portions which protrude inwardly toward the cathode and are symmetrically disposed around it. The hot cathode 82 serves to provide a priming current for building up a circulating space charge caused in large part by secondary emission from the cold cathode. A magnetic field, which may be produced by a magnetizing coil which is here represented diagrammatically by the dot and dash line 84, produces flux lines extending substantially parallel to the axes of the cathodes. Output energy from the anode is taken from a loop 85, as shown, and passed over a suitable transmission line 86 to the antenna by way of transmit receive device 9, if such a device is employed. Although I have shown one particular type of magnetron oscillator as described in my copending application supra, it should be clearly understood that, if desired, other oscillators capable of producing extremely short pulses of ultra high frequency energy may be used in place of the magnetron oscillator shown in the drawing. The ultra high frequency energy may correspond to a wavelength less than one meter. Also, the pulse output of tube 43 may control operation of a pulser capable of pulsing the whole anode power pulse input to the magnetron more or less according to common practice in present radar transmitters.

Figure 6:
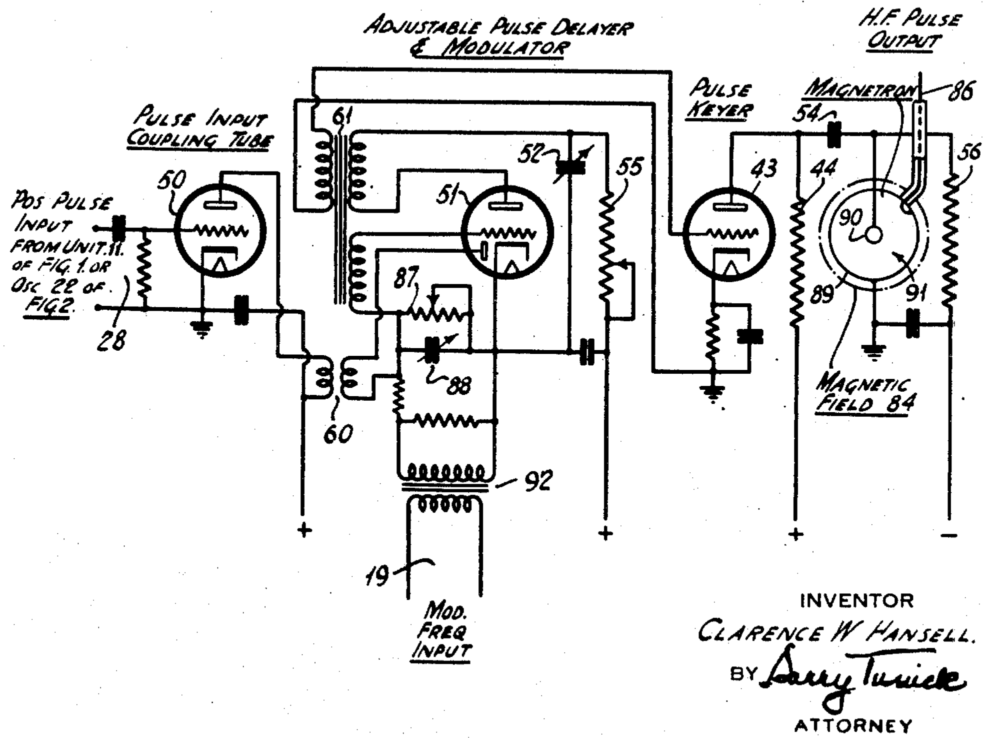

Fig. 6 shows an alternative form of adjustable pulse delayer and modulator and pulse oscillator circuit which can be used for the combined units 10 and 12 of Fig. 1. This particular circuit comprises a pulse input coupling tube 50, which receives positive input pulses from unit 11 of Fig. 1 over leads 28 and passes these pulses on to adjustable pulse delayer and modulator vacuum tube circuit 51 by way of transformer 60. One winding of a pulse feed-back transformer 61 is shown coupled to the pulse keyer having a tube 43, the latter controlling the high frequency pulse output energy from a suitable magnetron oscillator illustrated diagrammatically, by way of example only, by the reference numeral 91. During most of the time, tube 50 is non-conductive and requires a positive pulse over leads 28 to make this tube carry current. Pulse keyer tube 43 is also normally non-conductive, in which condition there will be no potential difference across the resistor 44 in the anode circuit of the keyer tube. In the system of Fig. 6, the positive input pulses impressed upon leads 28 by the receiver unit 11, or from oscillator 22 of Fig. 2, cause pulses of anode current to pass through the pulse input coupling tube 50, which, by coupling over transformer 60, drives the diode anode positive in the pulse delayer and modulator tube 51. As a result, the diode anode of tube 51 is made to carry rectified current to the cathode of the same tube. After the pulses, the grid or control electrode of tube 51 is left negative, thus blocking flow of main anode current for a time and causing the condenser 52 between the anode and cathode of the tube 51 to charge up to nearly full power supply potential through an adjustable charging resistance 55. After an adjustable time interval, the positive potential on the main anode becomes great enough and the negative grid potential of tube 51 leaks down to a value low enough to permit anode current to flow, which, by feed-back coupling through the transformer 60, results in a pulse of current very largely discharging the storage condenser 52. The resistance shown in the connection to the control electrode prevents substantial rectification of current due to positive feed-back potential and so leaves the grid almost without negative bias potential after the anode current pulse. Pulse potential from another winding on the transformer 61 (as shown) is applied to the pulse keyer 43 which causes a pulse of increased potential on the magnetron 91, making it oscillate momentarily and deliver a pulse of high frequency power to the output transmission line 86. At this time, it should be observed that when the pulse keyer tube 43 is normally cutoff between pulses applied thereto, the condenser 54 charges up over resistors 44 and 56. When the tube 51 is pulsed positive by transformer 60, however, the tube 43 passes current and permits the condenser 54 to discharge across the magnetron 91 and the tube 43 in series. The adjustment of the time delay in the pulse delayer and modulator circuit is achieved by adjustment of the time constants of the resistance 87 and condenser 88 in the grid circuit of the tube 51, and also by adjusting the time constants of the resistance 55 and condenser 52 in the anode circuit of the tube 51. The modulation frequency input for modulating the time delay of pulsing of tube 51 is applied to the transformer 92 by way of leads 19 which, in turn, extend to unit 16 of Fig. 1. The oscillator 91 of Fig. 6 merely shows the essential elements of any well known magnetron, such as the magnetic field coil 84, the cylindrical anode 89 and the cathode 90. If desired, the circuit including the tube 43 and magnetron 91 of Fig. 6 can be substituted for the tube 43 and magnetron of Fig. 5.

From the foregoing, it will be appreciated that by modulating the time delay at any one station, I automatically modulate or change the frequency of the pulses at both stations of the two-way communication system of the invention.

Although the invention has been described with particularity with regard to modulating the pulse rate or pulse frequency for conveying the intelligence, it should be understood that, if desired, the circuits can be so arranged that the extremely high frequency energy of the pulse can be modulated in accordance with the intelligence to be transmitted. Thus, for applying telegraph, telephone, facsimile or other types of modulation to the pulses, it is contemplated that any one of a considerable number of modulation schemes may be employed, including the following: (1) Wide band frequency or phase modulation to the radio carrier currents which are transmitted in the form of pulses and which can be received through integrating circuits at the receiver followed by frequency or phase modulation detectors which are unresponsive to amplitude modulation or which are preceded by amplitude limiters or their equivalent for removing amplitude modulation before detection. (2) Modulations of the frequency or phase of pulses transmitted from each transmitter followed by reception with circuits responsive to variations in pulse frequency or timing. Circuits have already been described for this type of modulation. (3) Modulations of pulse amplitude followed by integration of pulse energy and amplitude modulation detection of the integrated energy. (4) Modulation in the length of pulses at each transmitter to vary the mean amplitude of currents arriving at each receiver in combination with amplitude modulation detection. In this case, it is assumed that the keying systems in each receiver for rendering the receiver responsive during only certain desired short time intervals are designed to result in responsive periods sufficiently long to include the longest required pulse while modulation is present. (5) Differential timing modulation of successive pulses transmitted in combination with receiver detectors responsive to this type of modulation following the teachings of my copending application Serial No. 367,688, filed November 29, 1940, now U. S. Patent No. 2,379,899, July 10, 1945. (6) Differential amplitude modulation of successive pulses in combination with detector system responsive to this type of modulation.

What is claimed is:

1. In combination, a multi-vibrator having two conditions of stability, said multivibrator comprising two electrode structures having cross-coupled grid and anode electrodes, a pair of rectifier structures, means respectively coupling the anodes of said rectifier structure to different anodes of said multivibrator for rectifying the output thereof each time said multi-vibrator changes its condition of stability, means for applying pulses of a predetermined polarity to the input of said multi-vibrator, and means for deriving output waves from the cathodes of said rectifiers.

2. In combination, a multi-vibrator comprising a pair of vacuum tube structures, said multivibrator having two conditions of stability, whereby either one structure or the other passes current at any one time, means for applying frequency modulated pulses of a predetermined polarity to the input of said multi-vibrator, and means coupled to the output of said multi-vibrator for rectifying the current passed therethrough each time it changes its condition of stability.

3. In combination, an unbalanced multi-vibrator circuit comprising a pair of vacuum tube structures, said multi-vibrator having one condition of temporary stability which it assumes for only a temporary period in response to a pulse of predetermined polarity and value applied to the input of said multi-vibrator, said multi-vibrator having another condition of stability which it assumes after the lapse of said temporary period, means for applying to the input of said multivibrator pulses whose rate or frequency is modulated, whereby said multi-vibrator is caused to produce a push-pull modulation frequency output, and an audio frequency amplifier comprising a pair of vacuum tube structures coupled to the output of said multi-vibrator.

4. In combination, an unbalanced multi-vibrator circuit comprising a pair of vacuum tube structures, said multi-vibrator having one condition of temporary stability which it assumes for only a temporary period in response to a pulse of predetermined polarity and value applied to the input of said multi-vibrator, said multi-vibrator having another condition of stability which it assumes after the lapse of said temporary period, means for applying to the input of said multi-vibrator pulses whose rate or frequency is modulated, whereby said multi-vibrator is caused to produce a push-pull modulation frequency output, and an audio frequency amplifier comprising a pair of vacuum tube structures coupled to the output of said multi-vibrator through a resistance-capacity low-pass filter.

5. A pulse modulation system comprising a trigger circuit having one degree of electrical stability, said trigger circuit having a stable state and an active state, said trigger including two electron discharge device-electrode structures each having an anode, a grid and a cathode, impedance elements cross-connecting the anodes with the grids of the devices, regeneratively, a direct connection between the cathodes, a common cathode resistor for said electrode structures, and means in circuit with said common cathode resistor for supplying recurring tripping pulses of a variable pulse rate to thereby cause said trigger circuit to produce unidirectional output pulses containing the modulation components.

6. A pulse demodulator comprising a trigger circuit having one degree of electrical stability, said trigger circuit having a stable state and an active state, said trigger including two electron discharge devices each having an anode, a grid and a cathode, impedance elements cross-connecting the anodes with the grids of the devices, regeneratively, a direct connection between the cathodes, a common cathode resistor for said devices, and means in circuit with said common cathode resistor for supplying recurring tripping pulses of a variable pulse rate to thereby cause said trigger circuit to produce unidirectional output pulses containing the modulation components, a rectifier circuit in the output of said trigger circuit, and an audio frequency transducer coupled to said rectifier circuit.

7. A pulse rate modulation system comprising a flip-flop multivibrator circuit having one degree of electrical stability, said flip-flop circuit having a stable state and an active state, a source of recurring pulses for repeatedly tripping said flip-flop circuit at the rate of said pulses, a source of modulation frequency coupled to said flip-flop circuit for varying the percentage time occupied by said flip-flop circuit in one state or the other, and a radio frequency oscillator under control of the output of said flip-flop circuit for producing pulses of radio frequency energy.

8. A pulse rate modulation system comprising a flip-flop multivibrator circuit having one degree of electrical stability, said flip-flop circuit having a stable state and an active state, a source of recurring pulses for repeatedly tripping said flip-flop circuit at the rate of said pulses, a source of modulation frequency coupled to said flip-flop circuit for varying the percentage time occupied by said flip-flop circuit in one state or the other, a pulse keyer tube normally biased to cut-off in the output of said flip-flop circuit, a radio frequency oscillator under control of said keyer tube, whereby a positive pulse from said flip-flop circuit causes said keyer tube to pass current momentarily and operate said radio frequency oscillator.

9. A distance selective pulse communication system comprising a station including a flip-flop multivibrator circuit having one degree of electrical stability, said flip-flop circuit having a stable state and an active state, a source of recurring pulses for repeatedly tripping said flip-flop circuit at the rate of said pulses, a source of modulation frequency coupled to said flip-flop circuit for varying the percentage time occupied by said flip-flop circuit in one state or the other, and a radio frequency oscillator under control of the output of said flip-flop circuit for producing pulses of radio frequency energy.

10. A distance selective pulse communication system comprising a station including a flip-flop multivibrator circuit having one degree of electrical stability, said flip-flop circuit having a stable state and an active state, a source of recurring pulses for repeatedly tripping said flip-flop circuit at the rate of said pulses, a source of modulation frequency coupled to said flip-flop circuit for varying the percentage time occupied by said flip-flop circuit in one state or the other, and a radio frequency oscillator under control of the output of said flip-flop circuit for producing pulses of radio frequency energy, said source of recurring pulses comprising a receiver at said station for receiving pulses from a remote station, said receiver including a pulse oscillator and means for synchronizing said pulse oscillator in accordance with the received pulses.

11. In combination, a flip-flop circuit comprising a pair of vacuum tube structures so interconnected and arranged that either one structure or the other passes current at any one time, means for applying frequency modulated pulses of a predetermined polarity to the input of said flip-flop circuit, and means coupled to the output of said flip-flop circuit for rectifying the current passed therethrough each time it changes from one condition in which one structure passes current to the other condition in which the other structure passes current.

12. A pulse modulation system comprising a trigger circuit, said trigger including two electron discharge device-electrode structures each having an anode, a grid and a cathode, impedance elements cross-connecting the anodes with the grids of the devices, regeneratively, a direct connection between the cathodes, a common cathode resistor for said electrode structures, and means in circuit with said common cathode resistor for supplying recurring tripping pulses of a variable pulse rate to thereby cause said trigger circuit to produce unidirectional output pulses containing the modulation components.

13. A pulse rate modulation system comprising a flip-flop circuit, a source of recurring pulses for repeatedly tripping said flip-flop circuit at the rate of said pulses, a source of modulation frequency coupled to said flip-flop circuit for varying the percentage time occupied by said flip-flop circuit in one state or the other, and a radio frequency oscillator under control of the output of said flip-flop circuit for producing pulses of radio frequency energy.

14. A combined limiter and demodulator of frequency modulated pulses comprising: a multivibrator having two conditions of stability, said multivibrator comprising two electrode structures having cross-coupled grid and anode electrodes, a pair of rectifier structures, means respectively coupling the anodes of said rectifier structures to different anodes of said multivibrator for rectifying the output thereof each time said multivibrator changes its condition of stability, means for applying frequency modulated pulses of a predetermined polarity to the input of said multivibrator, and means for deriving output waves from the cathodes of said rectifiers.

15. A pulse modulation system comprising a flip-flop circuit having a stable state and an active state, means for repeatedly tripping said flip-flop circuit, means coupled to said flip-flop circuit for applying a modulation signal thereto to thereby vary the percentage time occupied by said flip-flop circuit in one state or the other, and an alternating current oscillator under control of the output of said flip-flop circuit for producing pulses of alternating current energy.

16. A pulse modulation system comprising a flip-flop circuit having a stable state and an active state, means for repeatedly tripping said flip-flop circuit, means coupled to said flip-flop circuit for applying a modulation signal thereto to thereby vary the percentage time occupied by said flip-flop circuit in one state or the other, means under control of the output of said flip-flop circuit for producing pulses of energy, and an alternating current oscillator under control of the output of said flip-flop circuit for producing pulses of alternating current energy.

17. In combination, an unbalanced multivibrator circuit comprising a pair of vacuum tube structures, said multi-vibrator having one condition of temporary stability which it assumes for only a temporary period in response to a pulse of predetermined polarity and value applied to the input of said multi-vibrator, said multivibrator having another condition of stability which it assumes after the lapse of said temporary period, means for applying to the input of said multi-vibrator pulses whose rate or frequency is modulated, whereby said multi-vibrator is caused to produce a push-pull modulation frequency output, and an audio frequency amplifier coupled to the output of said multi-vibrator through a low pass filter.

CLARENCE W. HANSELL.

REFERENCES CITED

The following references are of record in the file of this patent:

UNITED STATES PATENTS

| Number | Name | Date |
|---|---|---|
| 1,464,097 | Heising | Aug. 7, 1923 |
| 1,994,288 | Scheibell | Mar. 12, 1935 |
| 2,045,224 | Gerhard | June 23, 1936 |
| 2,199,179 | Koch | Apr. 30, 1940 |
| 2,266,401 | Reeves | Dec. 16, 1941 |
| 2,282,895 | Shepard | May 12, 1942 |
| 2,379,899 | Hansell | July 10, 1945 |
| 2,391,776 | Fredendall | Dec. 25,1945 |
| 2,392,114 | Bartelink | Jan. 1, 1946 |
| 2,392,546 | Peterson | Jan. 8, 1946 |
| 2,419,571 | Labin | Apr. 29, 1947 |
| 2,424,274 | Hansell | July 22, 1947 |
| 2,425,063 | Kahn et al. | Aug. 5, 1947 |
| 2,425,314 | Hansell | Aug. 12, 1947 |
| 2,432,204 | Miller | Dec. 9, 1947 |

OTHER REFERENCES

"Pennsylvania Turnpike Communication System," on page 34 of Electronics, vol. 15, No. 5 May 1942.